United States Patent
Nocon et al.

(10) Patent No.: US 12,042,719 B2
(45) Date of Patent: *Jul. 23, 2024

(54) GAMEPLAY USING MOBILE DEVICE SENSORS

(71) Applicant: Disney Enterprises, Inc., Burbank, CA (US)

(72) Inventors: Nathan D. Nocon, Valencia, CA (US); R. Hunter Gough, Duarte, CA (US)

(73) Assignee: Disney Enterprises, Inc., Burbank, CA (US)

( * ) Notice: Subject to any disclaimer, the term of this patent is extended or adjusted under 35 U.S.C. 154(b) by 426 days.

This patent is subject to a terminal disclaimer.

(21) Appl. No.: 17/109,381

(22) Filed: Dec. 2, 2020

(65) Prior Publication Data

US 2021/0086072 A1    Mar. 25, 2021

Related U.S. Application Data

(63) Continuation of application No. 16/275,093, filed on Feb. 13, 2019, now Pat. No. 10,898,795.

(51) Int. Cl.
    *A63F 13/92*    (2014.01)
    *A63F 13/21*    (2014.01)
    *A63F 13/24*    (2014.01)
    *G06F 3/0346*   (2013.01)

(52) U.S. Cl.
    CPC .............. *A63F 13/24* (2014.09); *A63F 13/21* (2014.09); *A63F 13/92* (2014.09); *G06F 3/0346* (2013.01)

(58) Field of Classification Search
    None
    See application file for complete search history.

(56) References Cited

U.S. PATENT DOCUMENTS

| | | | | |
|---|---|---|---|---|
| 7,435,179 B1* | 10/2008 | Ford | ................. | A63F 13/34 434/21 |
| 7,632,187 B1* | 12/2009 | Farley | ................. | F41A 33/02 434/21 |
| 8,469,824 B1* | 6/2013 | Farley | ................. | F41J 5/02 434/21 |
| 11,092,410 B1* | 8/2021 | Singer | ................. | A63F 13/245 |
| 2010/0279768 A1* | 11/2010 | Huang | ................. | A63F 13/22 463/31 |
| 2012/0271883 A1* | 10/2012 | Montoya | ................. | H04L 51/52 709/204 |
| 2014/0302919 A1* | 10/2014 | Ladd | ................. | A63F 13/46 463/29 |
| 2015/0119086 A1* | 4/2015 | Mirowski | ................. | G01C 21/206 455/456.6 |

(Continued)

*Primary Examiner* — Tramar Harper
(74) *Attorney, Agent, or Firm* — Patterson + Sheridan, LLP

(57) ABSTRACT

Embodiments relate to gameplay using mobile devices. Embodiments include receiving, by a first device, player input initiating a targeted action. Embodiments include determining, by the first device, an orientation of the first device. Embodiments include determining, by the first device, a location of at least a second device based at least on a message received from the second device. Embodiments include identifying, by the first device, that a target of the targeted action is associated with the second device based on the orientation of the first device and the location of the second device. Embodiments include transmitting, by the first device, an indication of the targeted action to the second device.

20 Claims, 6 Drawing Sheets

(56) References Cited

U.S. PATENT DOCUMENTS

| | | | |
|---|---|---|---|
| 2015/0141100 A1* | 5/2015 | Carter | F41A 33/00 |
| | | | 463/2 |
| 2015/0190709 A1* | 7/2015 | Moorthy | G09B 19/00 |
| | | | 463/9 |
| 2019/0081848 A1* | 3/2019 | Zou | A63F 13/213 |
| 2020/0368616 A1* | 11/2020 | Delamont | H04N 13/239 |
| 2021/0197058 A1* | 7/2021 | Margareten | A63B 69/32 |

* cited by examiner

GAMEPLAY USING MOBILE DEVICE SENSORS

CROSS-REFERENCE TO RELATED APPLICATIONS

This application is a continuation of co-pending U.S. patent application Ser. No. 16/275,093, filed Feb. 13, 2019 and is herein incorporated by reference in its entirety.

BACKGROUND

Field of the Invention

The present invention generally relates to using computing devices in gameplay, and more specifically to techniques for using particular sensors of mobile devices to facilitate freeze tag games.

Description of the Related Art

Various mobile computing devices, such as wearable devices, may be used for both practical and recreational purposes. For example, mobile computing devices may be used to enhance "real-world" activities, such as game play. Conventionally, standalone devices have been used to facilitate gameplay. Such standalone devices are generally expensive to produce, and have various limitations in functionality, benefit, cost, and the like, and may be difficult to market.

As mobile computing devices become more advanced and prevalent, there are increasingly greater opportunities to use mobile computing devices to enhance real-world activities.

SUMMARY

The present disclosure provides, in one embodiment, a method comprising: receiving, by a first device, player input initiating a targeted action; determining, by the first device, an orientation of the first device; determining, by the first device, a location of at least a second device based at least on a message received from the second device; identifying, by the first device, that a target of the targeted action is associated with the second device based on the orientation of the first device and the location of the second device; and transmitting, by the first device, an indication of the targeted action to the second device.

The present disclosure provides, in another embodiment, a computer-readable medium comprising instructions that, when executed by one or more processors, cause the one or more processors to perform an operation, the operation comprising: receiving, by a first device, player input initiating a targeted action; determining, by the first device, an orientation of the first device; determining, by the first device, a location of at least a second device based at least on a message received from the second device; identifying, by the first device, that a target of the targeted action is associated with the second device based on the orientation of the first device and the location of the second device; and transmitting, by the first device, an indication of the targeted action to the second device.

The present disclosure provides, in another embodiment, a system comprising one or more processors and a computer-readable medium comprising instructions that, when executed by the one or more processors, cause the one or more processors to perform an operation, the operation comprising: receiving, by a first device, player input initiating a targeted action; determining, by the first device, an orientation of the first device; determining, by the first device, a location of at least a second device based at least on a message received from the second device; identifying, by the first device, that a target of the targeted action is associated with the second device based on the orientation of the first device and the location of the second device; and transmitting, by the first device, an indication of the targeted action to the second device.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
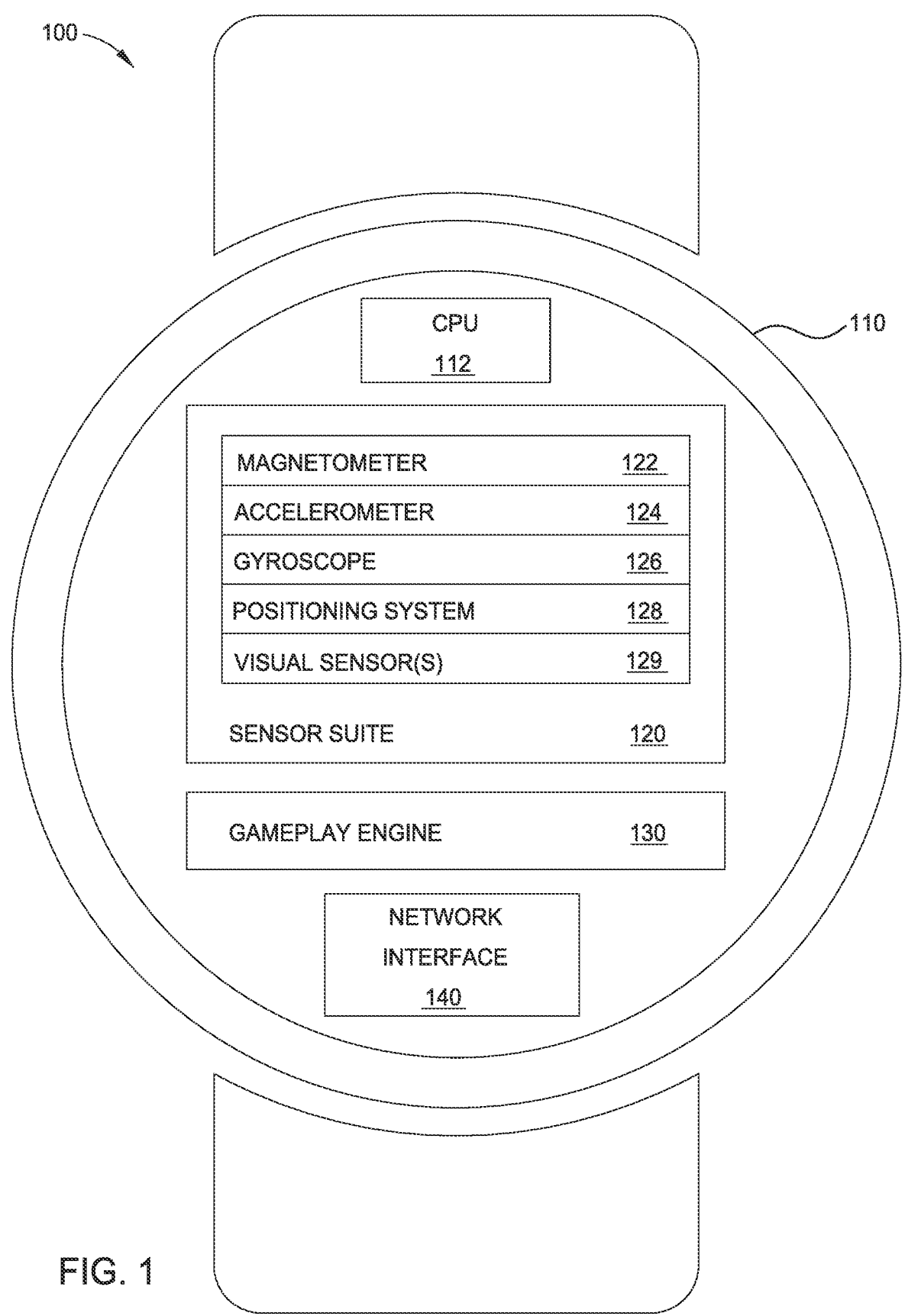
FIG. 1 illustrates a mobile device with which embodiments of the present disclosure may be implemented.

The present invention generally relates to using computing devices in gameplay. Mobile device are becoming more prevalent, and often include a variety of sensors. For example, mobile phones and smartwatches are often equipped with accelerometers, magnetometers, gyroscopes, satellite-based positioning systems, as well as cameras, microphones, and other input devices that allow data to be gathered from environments in which the mobile devices are operated.

Techniques described herein make use of sensors associated with mobile devices to facilitate real-world gameplay. In certain embodiments, smartwatches are used to perform a freeze tag game. "Freeze tag" generally refers to a game in which players who are tagged are "frozen" and must stand in place until they are unfrozen. An unfrozen player (e.g., on the same team as the frozen player) can perform an action to unfreeze them, such as tagging them, crawling between their legs, or touching their outstretched hand.

As used herein, a smartwatch generally refers to a wearable device in the form of a wristwatch that includes various computing components and performs various computing functions, such as network connectivity. For example, a group of players (e.g., users) may wear smartwatches equipped with particular components described herein, and may provide input to and receive output from the smartwatches related to the game.

In one example, a first player starts a game through interaction with a first smartwatch and additional players join the game through interactions with smartwatches that are connected to the first smartwatch over a data connection, such as a wireless network connection. Each player's smartwatch determines its location, such as using a satellite positioning system, and provides its location to the other players' smartwatches. In some implementations, the first smartwatch hosts, while in other implementations the game may be hosted amongst the game players' smartwatches. In yet another implementation, a remote server may host the game and each of the game players' smartwatches may communicate with that server.

To "tag" another player, a given player may lift an arm on which the smartwatch is worn and point it in the direction of the target player. The given player may then "trigger" a targeted action (e.g., a tag action), such as by performing a gesture, pressing a button on the player's smartwatch, or saying a phrase aloud. The player's smartwatch may determine its orientation (e.g., the smartwatch's three-dimensional orientation) using its integrated sensors. For example, the smartwatch may use an integrated accelerometer, magnetometer, and gyroscope to determine a yaw, pitch, and roll of the smartwatch. The smartwatch then uses its determined orientation to identify another player that is the target of the given player's targeted action. For example, if the smartwatch's orientation is determined to be pointing in a particular direction in three-dimensional space, the smartwatch will determine if another player is located in that direction based on the location data received from the other smartwatches. For example, a location associated with a given player's smartwatch may encompass an area in which the given player is assumed to be located. If a particular player's smartwatch is located in the direction indicated by the smartwatch's orientation, the particular player may be identified as the target of the targeted action.

The smartwatch may send an indication of the targeted action to the other player's smartwatch (e.g., via a direct data transmission or over a shared network connection), such as indicating that the other player has been tagged, hit, blasted, frozen, or the like. Upon receiving the indication, the other player's smartwatch may, in some embodiments, light up, make sound, display text, colors, and/or images, and/or otherwise indicate that it has been tagged. The other player's smartwatch may also notify all other smartwatches in the game that it has been tagged. In some embodiments, once a player has been tagged the player is "frozen" until some condition is met, such as a time interval passing or an additional operation being performed (e.g., a different targeted action to the player by another member of the player's team). As such, a tagged smartwatch may notify all of the other smartwatches in the game that it is not vulnerable to being tagged again until the condition is met (e.g., via a status message). In some embodiments, each smartwatch displays a color indicating its status, such as blue for frozen and red for active. The smartwatches may, in some instances, have active bands that display colors or may link to other wearable accessories that can likewise display status indications.

Many other variations and operations are possible, as described in more detail below.

FIG. 1 illustrates an example 100 of a mobile device 110 with which embodiments of the present disclosure may be implemented. While mobile device 110 is depicted as a smartwatch, it is noted that the components of mobile device 110 may alternatively be implemented in other types of mobile devices, such as mobile phones, head-mounted displays, augmented reality and mixed reality goggles, glasses, and the like.

Mobile device 110 includes a central processing unit (CPU) 112, a sensor suite 120, a gameplay engine 130, and a network interface 140.

CPU 112 may receive and execute instructions in order to perform operations described herein. CPU 112 is included to be representative of a single CPU, multiple CPUs, a single CPU having multiple processing cores, and other arrangements.

In this example, the sensor suite 120 includes a magnetometer 122, an accelerometer 124, a gyroscope 126, a positioning system 128, and (optionally) one or more visual sensors 129. In other implementations, the sensor suite 120 may include additional sensors, several instances of each sensor, or may omit some of the example sensors discussed herein.

Magnetometer 122 is a sensor that provides a bearing to a north pole of a magnetic field in the environment in which mobile device 110 is present. Magnetometer 122 may thus provide mobile device 110 with a directional sense in terms of yaw orientation with respect to magnetic north. For example, magnetometer 122 may output data indicating a strength, direction, and/or change in a magnetic field, which may be used (e.g., by gameplay engine 130) in determining a yaw orientation of mobile device 110.

Accelerometer 124, which measures acceleration forces acting on mobile device 110, may provide mobile device 110 with information regarding whether mobile device 110 (or a portion thereof) is moving, and in which direction(s). For example, accelerometer 124 may output detected x, y, and z acceleration values for mobile device 110.

Gyroscope 126 measures orientation of mobile device 110 (or a portion thereof), and may provide mobile device 110 with information of whether mobile device 110 (or portion thereof) is level or to what degree mobile device 110 is tilted in one or more planes. For example, gyroscope 126 may output detected x, y, and z angular velocities for mobile device 110.

The combination of the accelerometer 124 and gyroscope 126 may thus provide mobile device 110 with a directional sense in terms of pitch and roll with respect to gravity. For example, the data outputs from accelerometer 124 and gyroscope 126 may be used (e.g., by gameplay engine 130) in determining a pitch orientation and a roll orientation of mobile device 110.

Positioning system 128 may provide absolute/global positioning information (e.g., via a satellite-based positioning system receiver, such as a Global Positioning System (GPS) receiver, GNSS receiver, GLONASS receiver, etc.) and/or relative positioning information (e.g., via a range finder, a camera sensor including image recognition software to identify objects and distances thereto based on known sizes). In some embodiments, positioning system 128 may use assisted GPS (AGPS) via one or more cellular networks.

The one or more visual sensors 129, which are optional, may include one or more cameras, in some embodiments including cameras configured to sense visible light and/or infrared light. For example, where mobile device 110 is a smartwatch, smartphone, or tablet device, visual sensor(s) 129 may include a camera on a front face of mobile device 110 (e.g., upward facing).

In certain embodiments, a camera-based visual sensor may be accompanied by a pop-up mirror, which redirects the field of view of the camera for purposes of the gameplay. In some implementations, the mirror is a one-way mirror, also called a two-way mirror or half-silvered mirror or semi-transparent mirror, which is reflective on one side and transparent at the other. Further, the pop-up mirror may be oriented at, for example, a 45-degree angle relative to the front face of mobile device 110, in order to redirect images from an outward direction into the camera, such as when the camera is upward-facing from a player's wrist. This may allow the camera to capture images in an outward direction, such as if a first player is wearing mobile device 110 on the first player's wrist and pointing with the first player's wrist at a second player, thereby allowing mobile device 110 to capture images of the second player even if mobile device 110 is only equipped with a camera that faces upward from the face of a wristwatch. It is noted that cameras and pop-up mirrors are optional, and embodiments of the present disclosure may be implemented without either or both of these components.

Gameplay engine 130 performs various operations described herein related to using mobile device 110 to facilitate gameplay. For example, gameplay engine 130 may be an application running on mobile device 110 that enables a player of mobile device 110 to play one or more games, such a freeze tag game, as described herein. In some embodiments, gameplay engine 130 comprises a player interface through which a player interacts with and receives input from gameplay engine 130, such as via a display (e.g., which may be a touch-sensitive display) integrated with mobile device 110.

Network interface 140 represents one or more components that enable network connectivity for mobile device 110. For example, network interface 140 may be a network interface controller (NIC) and/or one or more additional components that enable mobile device 110 to connect to a network such as the internet, a cellular network, mobile data network, local area network (LAN), wide area network (WAN), peer-to-peer connection (e.g., Bluetooth connection), ad-hoc network, and/or the like.

As described below with respect to FIG. 2, mobile device 110 may be representative of each of a plurality of mobile devices used by a plurality of players to facilitate gameplay.

Figure 2:
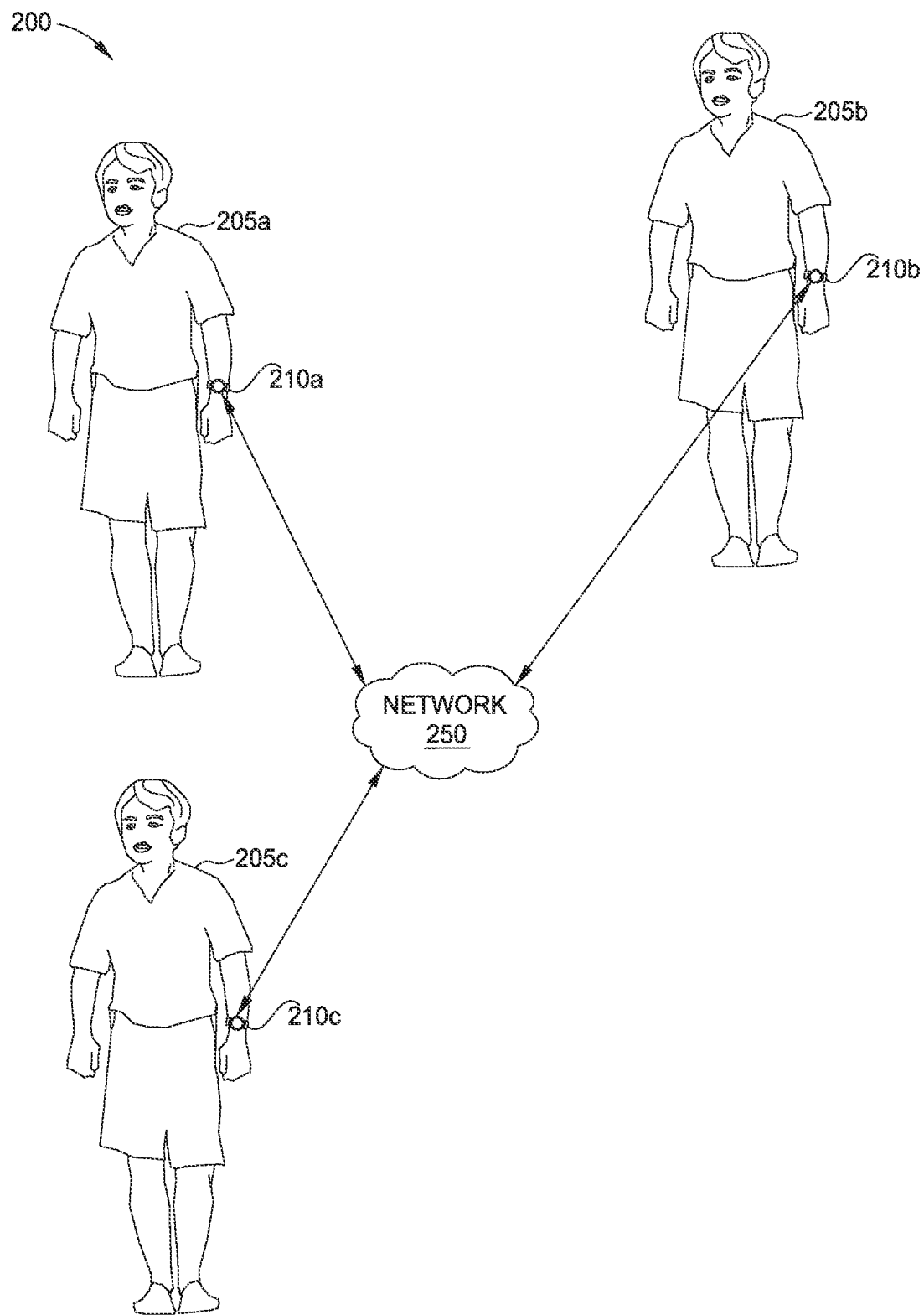
FIG. 2 illustrates an example networking environment in which embodiments of the present disclosure may be implemented.

FIG. 2 illustrates an example networking environment 200 in which embodiments of the present disclosure may be implemented. FIG. 2 is described in conjunction with FIG. 3A, which illustrates an example 300A of target identification according to embodiments of the present disclosure Networking environment 200 includes a plurality of mobile devices 210a, 210b, and 210c worn by players 205a, 205b, and 205c, respectively, and connected together over network 250. In some embodiments, network 250 may represent the internet, a cellular network, mobile data network, local area network (LAN), wide area network (WAN), peer-to-peer connection (e.g., Bluetooth connection), or the like.

Players 205a, 205b, and 205c may be players in a game, and mobile devices 210a, 210b, and 210c may each include components described above with respect to mobile device 110 of FIG. 1.

For example, mobile devices 210a, 210b, and 210c may each include a touch-sensitive display that is used to receive input from and provide output to players 205a, 205b, and 205c. In one example, player 205a may start a game by interacting with a touch-sensitive display of mobile device 210a, and players 205b and 205c may join the game through interactions with touch-sensitive displays of mobile devices 210b and 210c. Mobile devices 210b and 210c may each initiate a connection with mobile device 210a (and with each other) via network 250. In some embodiments, players 205b and 205c join the game by providing a credential or identifier to mobile devices 210b and 210c, such as a game identifier (e.g., which players 205b and 205c may have received from player 205a). It is noted that these are only included as example techniques for starting and joining a game, and other techniques may be used.

In some embodiments, each of players 205a, 205b, and 205c provides certain player data, such as a playername and/or character selection. In certain embodiments, each player selects a character from a list of characters. Each character may be associated with certain behaviors and/or abilities related to gameplay. For example, different characters may be associated with different gestures, voice commands, and other forms of input for performing certain actions, such as tagging another player, unfreezing another player, defending against a tag from another player, and the like. As such, a given player 210a, 210b, or 210c may provide different types of input and/or receive different output (e.g., different colors, different audio responses, different images and/or text, and the like) via mobile device 210a, 210b, or 210c depending on which character the player selects.

Once gameplay begins, each of mobile devices 210a, 210b, and 210c may exchange location data at regular intervals such that each mobile device is aware of the locations of the other mobile devices in the game. For example, each of mobile devices 210a, 210b, and 210c may comprise the components of mobile device 110a of FIG. 1, and a respective device's gameplay engine 130 of FIG. 1 may use the respective device's positioning system 128 of FIG. 1 to determine the respective device's location, and may transmit the respective device's location to the other devices in the game via the respective device's network interface 140 of FIG. 1 at regular intervals.

Consider an example where player 205a intends to tag player 205b. Player 205a lifts the arm on which player 205a wears mobile device 210a in the direction of player 205b. Player 205a then performs a trigger for a targeted action (e.g., a tag). For example, the trigger may be particular gesture, a voice command, and/or a touch of a component or button of mobile device 210a.

In some examples, the trigger is specific to a character selected by player 205a. In one example, the trigger is a gesture in which player 205a pulls back the arm on which player 205a wears mobile device 210a and/or pushes the arm forward, which is detected using one or more sensors of sensor suite 120 of FIG. 1.

Upon detecting the trigger, mobile device 210a determines an orientation of mobile device 210a. In alternative embodiments, mobile device 210a determines the orientation of mobile device 210a as soon as player 205a points rather than waiting for the trigger. Mobile device 210a may determine its orientation using sensors. For example, mobile device 210a's gameplay engine 130 of FIG. 1 may use components of sensor suite 120 of FIG. 1. In some embodiments, magnetometer 122 of FIG. 1 may be used to determine a yaw value and accelerometer 124 and gyroscope 126 of FIG. 1 may be used to determine a pitch value and a roll value. In some embodiments, a complimentary filter or a fixed gain Kalman filter accepts magnetometer data for yaw correction, and is further used in determining the orientation of mobile device 210a. Once the orientation of mobile device 210a is determined, mobile device 210a's gameplay engine 130 of FIG. 1 uses the determined orientation in conjunction with location data received from mobile devices 210b and 210c to determine a target indicated by player 210a.

Figure 3A:
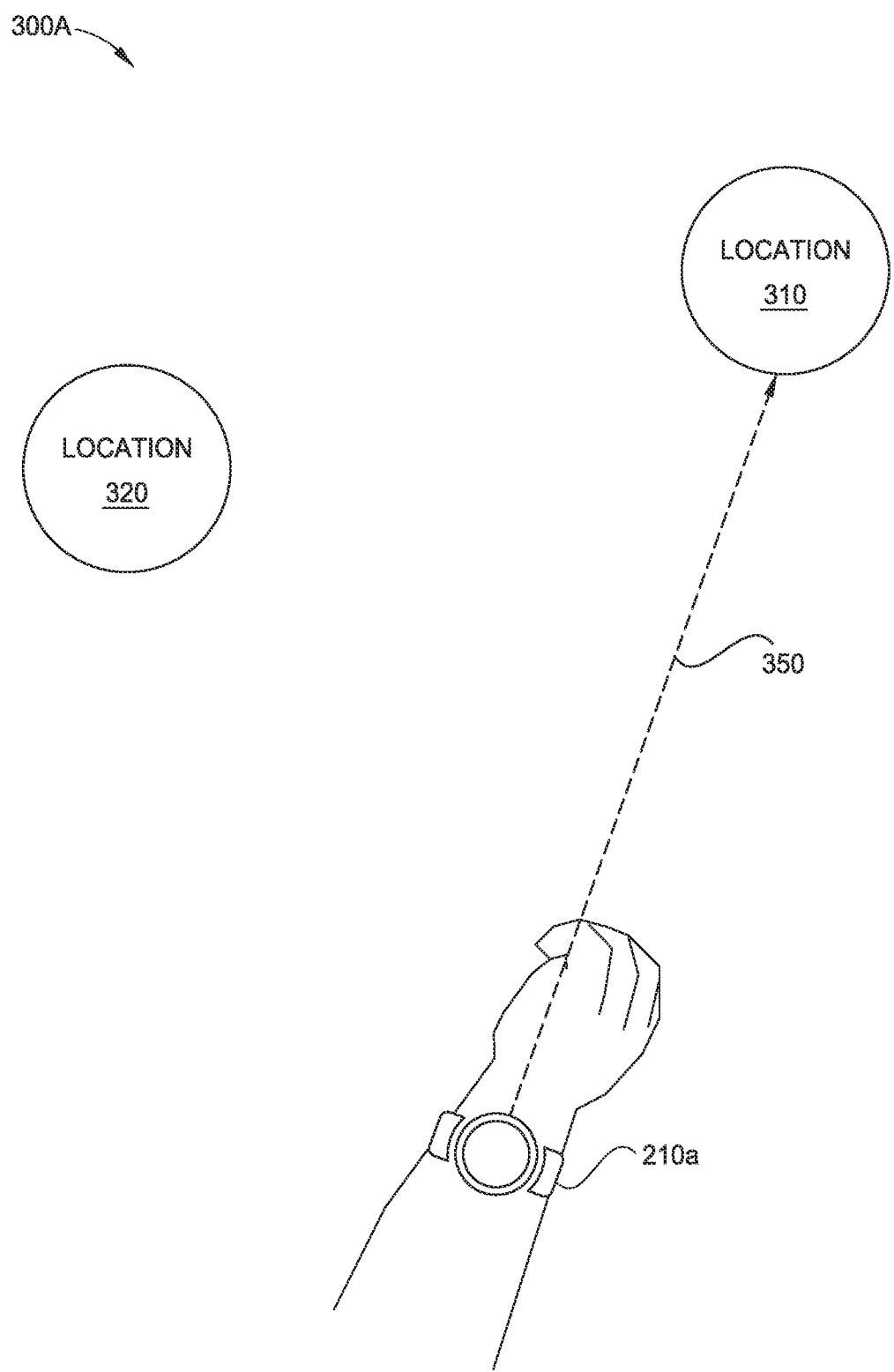
FIG. 3A illustrates an example of target identification according to embodiments of the present disclosure.

As shown in FIG. 3A, mobile device 210a determines a direction 350 indicated by the determined orientation. For example, direction 350 may be a direction in three-dimensional space based on the yaw, pitch, and roll of the determined orientation. Location 310 represents a location of mobile device 210b and location 320 represents a location of mobile device 210c. For example, mobile device 210a may have received locations 310 and 320 from mobile devices 210b and 210c respectively.

In example 300A, mobile device 210a determines that location 310 (received from mobile device 210b) is located in the direction 350 indicated by the orientation of mobile device 210a. For example, this may be because player 205a is pointing at player 205b with the arm on which player 205a wears mobile device 210a. As such, mobile device 210b is identified by mobile device 210a as the target of the targeted action.

In some embodiments, mobile device 210a determines a status of mobile device 210b. In some embodiments, the status of mobile device 210b may indicate whether mobile device 210b is vulnerable to the targeted action. For example, if mobile device 210b was previously tagged and is still frozen (e.g., a time interval associated with the tag has not yet expired and/or an action has not yet been performed to unfreeze mobile device 210b), mobile device 210b may have provided a message indicating its status (e.g., vulnerability indicator) to mobile devices 210a and 210c that indicates mobile device 210b is not currently vulnerable to be tagged (e.g., while a player is frozen, that player is not vulnerable to be tagged again until the player is unfrozen).

In some embodiments, vulnerability may also be based on whether or not a targeted player performs a defensive action, such as within a time interval. For example, if player 205b performs a certain gesture (e.g., which may be specific to a character selected by player 210b) simultaneously with or within a time interval of the trigger detected by mobile device 210a, then mobile device 210b (upon detecting the defense gesture using one or more sensors) may send an updated vulnerability indicator to mobile device 210a (and, in some instances, mobile device 210c) indicating that mobile device 210b is not vulnerable to the targeted action (e.g., for a time interval). Upon detecting a successful defensive gesture, mobile device 210b may display feedback indicating a successful defense, such as color, light, text, images, and/or audio.

If mobile device 210a determines that mobile device 210b is vulnerable to the targeted action, mobile device 210a sends an indication of the targeted action to mobile device 210b. Alternatively, mobile device 210a may send the indication of the targeted action to mobile device 210b regardless of vulnerability, and mobile device 210b may respond with an indication of whether the targeted action was successful (e.g., based on whether or not mobile device 210b is vulnerable to the targeted action). Mobile device 210a may provide output indicating whether the targeted action was successful.

Upon receiving the indication of the targeted action, and in some cases upon determining that it is vulnerable to the targeted action, mobile device 210b processes the targeted action. For example, mobile device 210b may provide output indicating that it has been tagged, such as by displaying a series of colors, lights, text, images, and/or audio. Mobile device 210b may also transmit a notification that it has been tagged, in some embodiments including an updated vulnerability indicator indicating that it is not vulnerable to be tagged (e.g., until unfrozen), to mobile devices 210a and 210c.

Mobile device 210b may display an indicator, such as a particular color on its screen and/or band, as long as it is frozen. Mobile device 210b may remain frozen until some condition is met, such as the passage of a time interval, an action performed by player 210b, and/or an action performed by another player (e.g., another player that is on a team with player 210b).

For example, the action to unfreeze mobile device 210b may be a gesture performed by player 205b or another player, such as player 205c. In one example, player 205c performs a particular gesture while pointing at player 205b, which is detected using sensors and location data as described above with respect to example 300A of FIG. 3A, to unfreeze mobile device 210b. In another embodiment, player 205c touches mobile device 210c to mobile device 210b (or brings mobile device 210c within a certain distance of mobile device 210b) to unfreeze mobile device 210b (e.g., mobile device 210b may detect the touch or proximity of mobile device 210c based on location data, using near field communication (NFC), and/or data from one or more sensors). In another embodiment, a step tracking component or other sensor of mobile device 210b is used to determine that player 205b has taken a certain amount of steps or has remained still for a certain amount of time in order to unfreeze mobile device 210b. Once unfrozen, mobile device 210b may provide output indicating that it is unfrozen, and then may provide an indicator to mobile devices 210a and 210c that it is unfrozen (e.g., including an updated vulnerability indicator indicating that mobile device 210b is vulnerable to being tagged).

In certain embodiments, one or more visual sensors may be used to determine additional data related to targeted actions. For example, a camera of mobile device 210a may capture image data, such as image data redirected to the camera via a pop-up half-silvered mirror integrated with mobile device 210a and located at a 45-degree angle with respect to the front face of mobile device 210a.

Figure 3B:
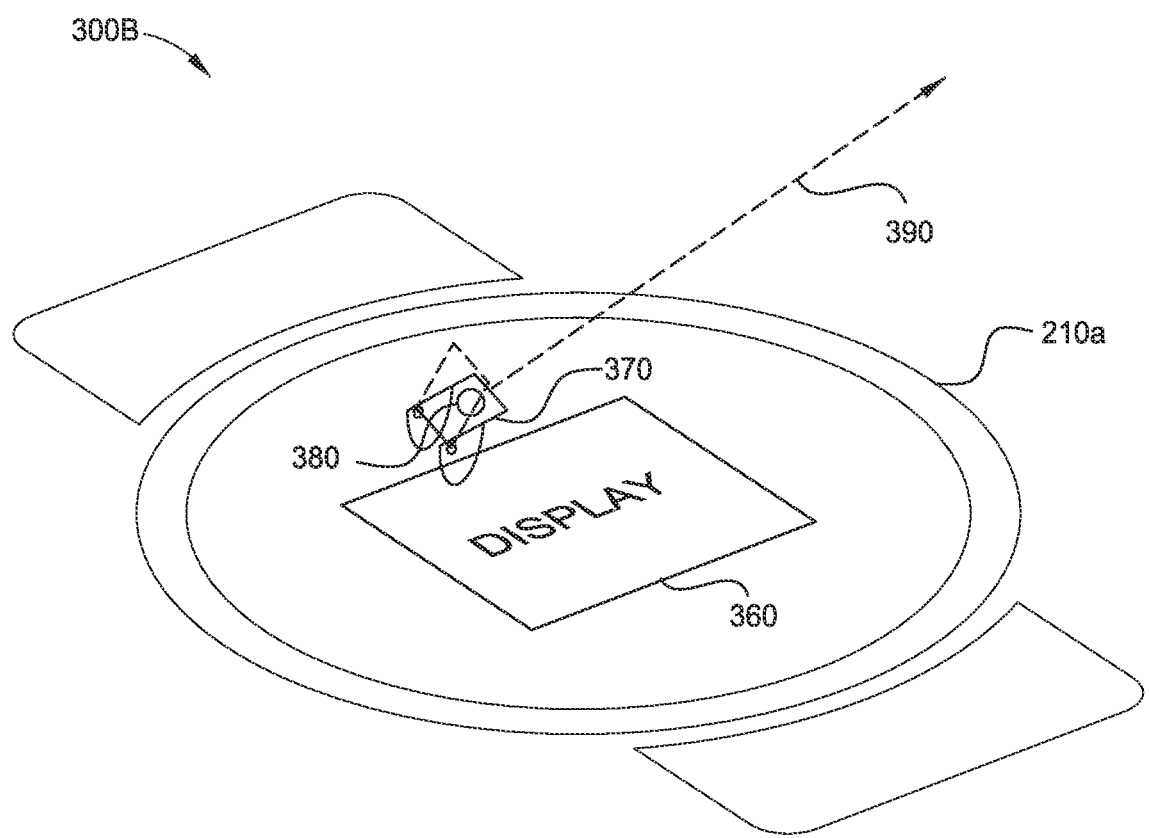
FIG. 3B illustrates an example of using a pop-up mirror in capturing image data according to embodiments of the present disclosure.

FIG. 3B illustrates an example 300B of using a pop-up mirror in capturing image data according to embodiments of the present disclosure. As shown in example 300B, mobile device 210a (e.g., of FIGS. 2 and 3A) comprises a display 360, a pop-up mirror 370, and a camera 380.

Display 360 may, for instance be a touch-sensitive display for receiving touch input from and providing output to player 205a of FIG. 2. Pop-up mirror 370 may be a mirror that can be flipped up in order to redirect the field of view of the camera 380 from an upward direction to an outward direction for purposes of gameplay. In some implementations, pop-up mirror 370 is a one-way mirror, also called a two-way mirror or half-silvered mirror or semi-transparent mirror, which is reflective on one side and transparent at the other. Using a semi-transparent mirror may allow for images to be redirected from an outward direction into the upward-facing camera 380 while still allowing camera 380 to capture images in an upward direction. Further, the pop-up mirror 370 may be oriented at, for example, a 45-degree angle relative to the front face of mobile device 210a (when popped up or flipped up), in order to redirect images from an outward direction into camera 380. This may allow camera 380 to capture images in an outward direction 390, such as if player 205a of FIG. 2 is wearing mobile device 210a on the player's wrist and pointing with the player's wrist at a second player (e.g., player 205b of FIG. 2), thereby allowing mobile device 210a to capture images of the second player even if mobile device 210a is only equipped with a camera that faces upward from the face of a wristwatch.

In some embodiments, mirror 370 automatically pops up immediately prior to the image data being captured, and is used to redirect image data in a direction 390 front of player 205a into camera 380. In another embodiment, player 205a may manually flip up mirror 370 at some point prior to capturing image data. For example, the image data may be used in identifying a target (e.g., player 205b) indicated by a targeted action. In certain embodiments, the image data is used to identify a more precise target, such as a location on the body of player 205b at which player 205a is pointing. For example, if mobile device 210a determines that player 205a is pointing with mobile device 210a directly at player 205b's shoulder, then the targeted action may be identified as a "shoulder strike". As such, one or more aspects related to gameplay may be modified based on the precise target. For example, mobile devices 210a and/or 210b may provide output indicating that the targeted action was a "shoulder strike". In other embodiments, image data may be used to determine whether a targeted action missed its intended target, such as if player 205a was pointing directly to the side of player 205a. In some embodiments, skeleton tracking, skeleton recognition, or other image recognition software may be used to identify the more precise target from image data.

In other embodiments, other sensor data can be used to better locate and identify players and their targets. For example, if more than one mobile device is located in the same general location as given by GPS, step tracking and audio sensing (e.g. voice recognition) can be used to assist in identifying a player or to calculate/predict a more precise location than as provided by GPS.

Figure 4:
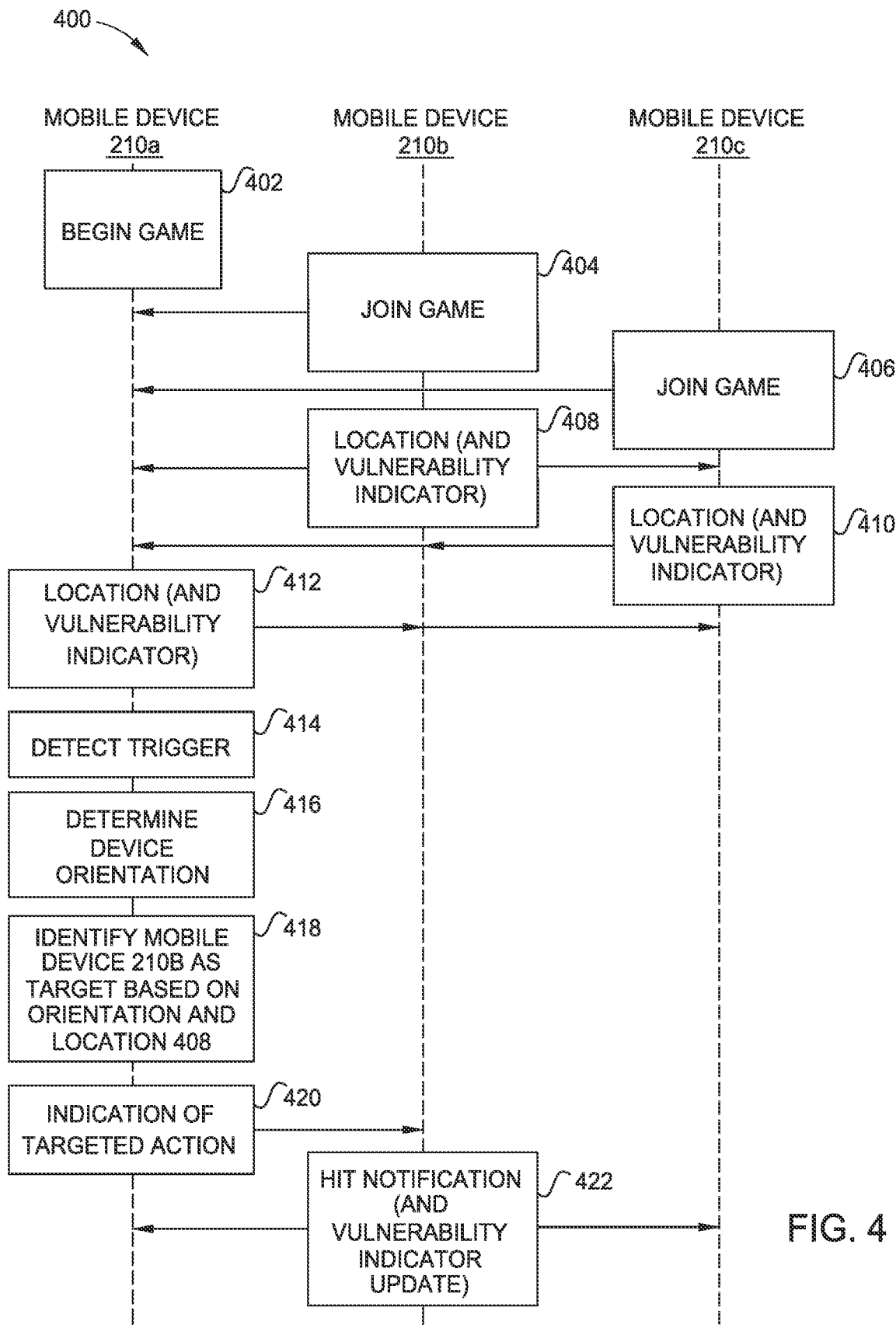
FIG. 4 illustrates an example exchange of messages between components related to using mobile devices in gameplay as described herein.

FIG. 4 illustrates an example 400 of an exchange of messages between components related to using mobile devices in gameplay as described herein. Example 400 includes mobile devices 210a, 210b, and 210c of FIG. 2, each of which may include components of mobile device 110 of FIG. 1.

At 402, mobile device 210 begins a game. For example, player 205a of FIG. 2 may provide input to mobile device 210a, such as via a voice command detected using a microphone of mobile device 210a, in order to begin the game. In some embodiments, a game identifier is associated with the game. In certain embodiments, mobile device 210a may transmit a broadcast message that may be received by mobile devices 210b and 210c indicating that the game has been started. In another embodiment, mobile device 210 may initiate the game by sending a message to a remote server that creates a game session that the mobile devices 210b and 210c may join.

At 404 and 406, mobile devices 210b and 210c join the game started by mobile device 210a. For example, players 205b and 205c of FIG. 2 may provide input, such as voice commands, to mobile devices 210b and 210c in order to join the game. In some embodiments, the game identifier is used to identify the game to be joined. Each of mobile devices 210b and 210c may establish a network connection with mobile device 210a and with each other. In certain embodiments, each of players 205a, 205b, and 205c of FIG. 2 selects a character by providing input to mobile devices 210a, 210b, and 210c at the beginning of the game.

At 408, 410, and 412, each of mobile devices 210a, 210b, and 210c transmits its location (and, in some instances, its status, which may start out indicating initial vulnerability to tags) to the other mobile devices in the game. For example, 408, 410, and 412 may be performed on an ongoing basis throughout the game, such as at regular intervals. Mobile devices 210a, 210b, and 210c may, for example, determine their own locations using positioning systems.

At 414, mobile device 210a detects a trigger. For example, mobile device 210a may determine that player 205a of FIG. 2 has performed a gesture, spoken a voice command, and/or provided touch input indicating a targeted action is to be performed.

At 416, mobile device 210a determines its orientation. For example, mobile device 210a may use one or more sensors to determine its three-dimensional orientation, such as based on a yaw, pitch, and roll.

At 418, mobile device 210a identifies mobile device 210b as a target based on mobile device 210a's orientation and mobile device 210b's location, received at 408. For example, mobile device 210a may determine a direction indicated by the orientation determined at 416, and may determine that mobile device 210b is located in the direction based on the location data received from mobile device 210b at 408.

At 420, mobile device 210a transmits an indication of the targeted action to mobile device 210b. In some embodiments, mobile device 210a first determines whether mobile device 210b is vulnerable to the targeted action, such as based on the status received from mobile device 210b at 408, while in other embodiments, mobile device 210a send the indication regardless of vulnerability and mobile device 210b responds with a notification of whether or not the targeted action as successful, such as based on its vulnerability.

At 422, mobile device 210b transmits a hit notification (and, in some embodiments, an updated status that indicates mobile device 210b is not vulnerable to targeted actions) to mobile devices 210a and 210c. For example, if mobile device 210b is vulnerable to the targeted action, mobile device 210b may receive the indication of the targeted action sent at 420 and process the targeted action. Mobile device 10b may provide output indicating the targeted action and may then notify mobile devices 210a and 210c that it has been "hit" (e.g., tagged and therefore is frozen), indicating that is not vulnerable to be tagged again until it has been unfrozen.

In some embodiments, each of mobile devices 210a, 210b, and 210c maintain a number of health points, and when a mobile device is successfully hit by a targeted action (e.g., tagged), the mobile device loses health points, in some embodiments notifying the other mobile devices of its current number of health points. When a mobile device runs out of health points, the player of the mobile device may be eliminated from the game.

Furthermore, in certain embodiments, cameras and pop-up mirrors integrated with mobile devices 210a, 210b, and/or 210c may be used to further enhance targeted actions as described above with respect to FIG. 3B.

Figure 5:
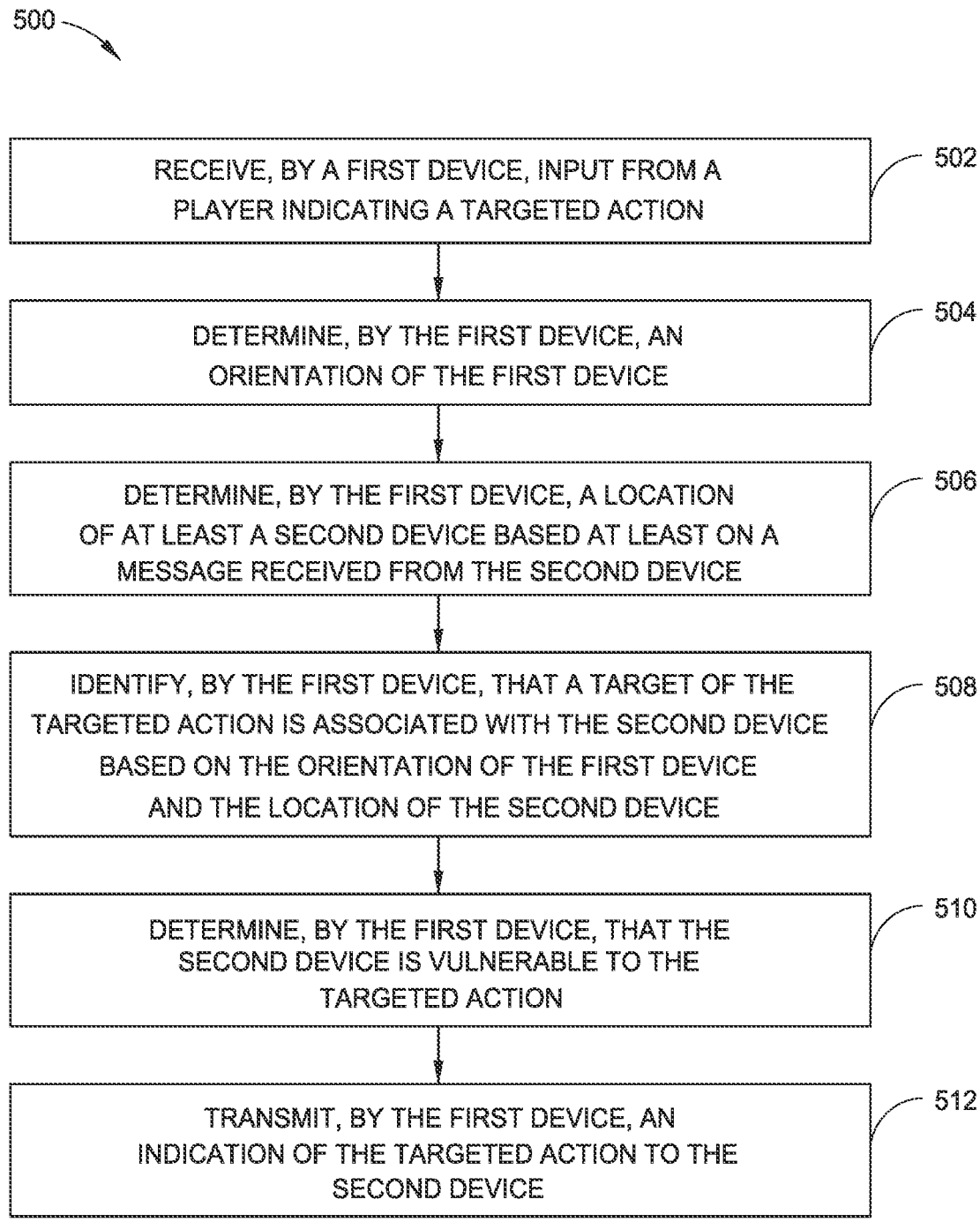
FIG. 5 illustrates example operations for using mobile devices in gameplay as described herein.

FIG. 5 illustrates example operations 500 for using mobile devices in gameplay as described herein. For example, operations 500 may be performed by gameplay engine 130 of FIG. 1.

At 502, a first device receives input from a player indicating a targeted action. For example, gameplay engine 130 of FIG. 1 may receive player input in the form of a voice command, gesture, and/or touch input. The player input may be determined to be a trigger for the targeted action. The targeted action may, for example, be a tag operation.

At 504, the first device determines an orientation of the first device. For example, gameplay engine 130 of FIG. 1 may use one or more sensors of sensor suite 120 (e.g., magnetometer 122, accelerometer 124, gyroscope 126, and/or image sensor(s) 129) of FIG. 1 to determine a three-dimensional orientation, such as including a yaw, pitch, and roll, of the first device. In some embodiments, determining the orientation involves using a filter to perform yaw correction.

At 506, the first device determines a location of at least a second device based at least on a message received from the second device. For example, gameplay engine 130 of FIG. 1 may receive location data from all other devices in the game, including the second device. Each device may, for instance, determine its own location using a positioning system, and may transmit its location to the other devices in the game at regular intervals.

At 508, the first device identifies that a target of the targeted action is associated with the second device based on the orientation of the first device and the location of the second device. For example, gameplay engine 130 of FIG. 1 may determine a direction in three-dimensional space indicated by the orientation determined at 504, and may determine that the location of the second device determined at 506 is located in the direction. As such, gameplay engine 130 may determine that a player associated with the second device is the target. In some embodiments, the first device may further use image data, such as captured using a camera and a pop-up mirror integrated with the first device, in identifying the target of the targeted action. For instance, the image data may be used to determine that the target is a particular portion (e.g., body part) of a player associated with the second device.

At 510, the first device determines that the second device is vulnerable to the targeted action. For example, gameplay engine 130 of FIG. 1 may use a status received from the second device to determine whether the second device is vulnerable to the targeted action. In alternative embodiments, the first device determines that the second device is vulnerable to the targeted action based on receiving a response from the second device indicating that the targeted action was successful (e.g., after 512).

At 512, the first device transmits an indication of the targeted action to the second device. For example, gameplay engine 130 of FIG. 1 may transmit an indication to the second device that it is the target of a tag operation. In some embodiments, the second device responds with an indication of whether or not the targeted action was successful. The first device and/or second device may provide output related to the targeted action, such as colors, lights, text, images, and/or sound.

As gameplay continues, the first device, the second device, and/or additional devices may continue to exchange location data and/or statuses, and additional targeted actions may be performed. For example, once the second device is unfrozen following the targeted action (e.g., when a condition is met, such as the expiration of a time interval or an action being performed), a player of the second device may perform a targeted action such as a tag on the first device. The first device may receive an indication of the targeted action and, if the first device is vulnerable to the targeted action, the first device may provide output indicating that it has been tagged. For example, the first device may modify its status based on the indication and/or modify a display or a light source associated with the first device based on the indication.

It is noted that certain components, rules, gestures, and orders of operations described herein are only included as examples, and other arrangements are possible without departing from the scope of the present disclosure.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the player's computer, partly on the player's computer, as a stand-alone software package, partly on the player's computer and partly on a remote computer or entirely on the remote computer or server. In the latter scenario, the remote computer may be connected to the player's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving, by a first device, player input initiating a targeted action;
   determining, by the first device, an orientation of the first device;
   determining, by the first device, a location of at least a second device based at least on a message received from the second device;
   identifying, by the first device, that a target of the targeted action is associated with the second device based on the orientation of the first device and the location of the second device;
   determining, by the first device, that the second device is vulnerable to the targeted action based on an indicator from the second device that is based on whether the second device has detected a defensive gesture; and
   transmitting, by the first device, an indication of the targeted action to the second device.

2. The method of claim 1, wherein receiving the player input initiating the targeted action comprises one of:
   detecting a gesture associated with the targeted action;
   detecting a voice command associated with the targeted action;
   detecting touch input; or
   detecting a press of a button.

3. The method of claim 1, wherein determining the orientation of the first device comprises:
   determining a yaw of the first device using a magnetometer; and
   determining a pitch and a roll of the first device using an accelerometer and a gyroscope.

4. The method of claim 1, wherein determining the orientation of the first device further comprises using a filter to perform yaw correction.

5. The method of claim 1, wherein identifying that the target of the targeted action is associated with the second device based on the orientation of the first device and the location of the second device comprises determining that the location of the second device is located in a direction indicated by the orientation of the first device.

6. The method of claim 1, wherein the method further comprises determining an updated status of the second device based on a message received from the second device.

7. The method of claim 1, wherein the method further comprises:
   receiving, by the first device, an indication from the second device of a new targeted action;
   modifying, by the first device, a status of the first device based on the indication; and
   modifying a display or a light source associated with the first device based on the indication.

8. The method of claim 1, wherein the method further comprises:
   capturing, by the first device, image data using a camera and a mirror integrated with the first device, wherein the image data is used in identifying the target of the targeted action.

9. A non-transitory computer-readable medium comprising instructions that, when executed by one or more processors, cause the one or more processors to perform an operation, the operation comprising:
   receiving, by a first device, player input initiating a targeted action;
   determining, by the first device, an orientation of the first device;
   determining, by the first device, a location of at least a second device based at least on a message received from the second device;
   identifying, by the first device, that a target of the targeted action is associated with the second device based on the orientation of the first device and the location of the second device;
   determining, by the first device, that the second device is vulnerable to the targeted action based on an indicator from the second device that is based on whether the second device has detected a defensive gesture; and
   transmitting, by the first device, an indication of the targeted action to the second device.

10. The non-transitory computer-readable medium of claim 9, wherein receiving the player input initiating the targeted action comprises one of:
   detecting a gesture associated with the targeted action;
   detecting a voice command associated with the targeted action;
   detecting touch input; or
   detecting a press of a button.

11. The non-transitory computer-readable medium of claim 9, wherein determining the orientation of the first device comprises:
   determining a yaw of the first device using a magnetometer; and
   determining a pitch and a roll of the first device using an accelerometer and a gyroscope.

12. The non-transitory computer-readable medium of claim 9, wherein determining the orientation of the first device further comprises using a filter to perform yaw correction.

13. The non-transitory computer-readable medium of claim 9, wherein identifying that the target of the targeted action is associated with the second device based on the orientation of the first device and the location of the second device comprises determining that the location of the second device is located in a direction indicated by the orientation of the first device.

14. The non-transitory computer-readable medium of claim 9, wherein the operation further comprises determining an updated status of the second device based on a message received from the second device.

15. The non-transitory computer-readable medium of claim 9, wherein the operation further comprises:
   receiving, by the first device, an indication from the second device of a new targeted action;
   modifying, by the first device, a status of the first device based on the indication; and
   modifying a display or a light source associated with the first device based on the indication.

16. The non-transitory computer-readable medium of claim 9, wherein the operation further comprises:
   capturing, by the first device, image data using a camera and a mirror integrated with the first device, wherein the image data is used in identifying the target of the targeted action.

17. A system, comprising:
   one or more processors; and
   a non-transitory computer-readable medium comprising instructions that, when executed by the one or more processors, cause the one or more processors to perform an operation, the operation comprising:
      receiving, by a first device, player input initiating a targeted action;
      determining, by the first device, an orientation of the first device;
      determining, by the first device, a location of at least a second device based at least on a message received from the second device;
      identifying, by the first device, that a target of the targeted action is associated with the second device based on the orientation of the first device and the location of the second device;
      determining, by the first device, that the second device is vulnerable to the targeted action based on an indicator from the second device that is based on whether the second device has detected a defensive gesture; and
      transmitting, by the first device, an indication of the targeted action to the second device.

18. The system of claim 17, wherein receiving the player input initiating the targeted action comprises one of:
   detecting a gesture associated with the targeted action;
   detecting a voice command associated with the targeted action;
   detecting touch input; or
   detecting a press of a button.

19. The system of claim 17, wherein determining the orientation of the first device comprises:
   determining a yaw of the first device using a magnetometer; and
   determining a pitch and a roll of the first device using an accelerometer and a gyroscope.

20. The system of claim 17, wherein determining the orientation of the first device further comprises using a filter to perform yaw correction.

* * * * *